United States Patent
Liu et al.

(10) Patent No.: US 10,560,505 B2
(45) Date of Patent: Feb. 11, 2020

(54) ROI VIDEO IMPLEMENTATION METHOD AND APPARATUS

(71) Applicant: Huawei Technologies Co., Ltd., Shenzhen (CN)

(72) Inventors: Liangliang Liu, Xi'an (CN); Weiwei Yang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 308 days.

(21) Appl. No.: 15/492,297

(22) Filed: Apr. 20, 2017

(65) Prior Publication Data
US 2017/0223079 A1 Aug. 3, 2017

Related U.S. Application Data

(63) Continuation of application No. PCT/CN2015/092104, filed on Oct. 16, 2015.

(30) Foreign Application Priority Data

Oct. 21, 2014 (CN) .......................... 2014 1 0562144

(51) Int. Cl.
*H04L 29/06* (2006.01)
*H04N 21/4728* (2011.01)
(Continued)

(52) U.S. Cl.
CPC ................ *H04L 65/4092* (2013.01)

(58) Field of Classification Search
CPC .... H04N 21/4728; H04N 21/658; H04N 7/18; H04N 21/41407; H04N 19/115;
(Continued)

(56) References Cited

U.S. PATENT DOCUMENTS 6,665,872 B1 * 12/2003 Krishnamurthy .. H04N 21/2365
375/240.26
6,775,412 B1 8/2004 Nister et al.
(Continued)

FOREIGN PATENT DOCUMENTS

CN 102687140 A 9/2012
CN 103179405 A 6/2013
(Continued)

OTHER PUBLICATIONS

Foreign Communication From a Counterpart Application, Chinese Application No. 201410562144.6, Chinese Office Action dated Mar. 5, 2018, 8 pages.
(Continued)

*Primary Examiner* — Hung Q Dang
(74) *Attorney, Agent, or Firm* — Conley Rose, P.C.

(57) ABSTRACT

A region of interest (ROI) video request processing method and apparatus, where the method includes obtaining an ROI video request sent by a receiving device; selecting a first proximity ROI video from proximity ROI videos, where the proximity ROI videos are generated ROI videos that include at least a partial region in a target region indicated by the ROI video request; and sending the first proximity ROI video to the receiving device. According to the embodiments, the ROI video request can be met without consuming an encoder resource to break through limitation caused by an encoder resource amount to a quantity of ROI video requests that can be simultaneously met by the sending device.

23 Claims, 11 Drawing Sheets

(51) Int. Cl.

| | | |
|---|---|---|
| *H04N 21/258* | (2011.01) | |
| *H04N 19/162* | (2014.01) | |
| *H04N 19/156* | (2014.01) | |
| *H04N 19/132* | (2014.01) | |
| *H04N 19/127* | (2014.01) | |
| *H04N 21/63* | (2011.01) | |
| *H04N 21/45* | (2011.01) | |
| *H04N 21/24* | (2011.01) | |

(58) Field of Classification Search
CPC .. H04N 21/4725; H04N 19/17; H04N 19/167; H04N 21/234345; H04N 19/162; H04N 21/4621; H04N 19/154; H04N 1/628; H04N 19/33; H04N 9/643; H04N 21/440263; H04N 19/156; H04N 21/6377; G06K 9/00248; G06K 9/3233; G06K 9/00234; G06K 2009/366; G06K 2009/4666; G06K 9/00261; G06K 9/3266
See application file for complete search history.

(56) References Cited

U.S. PATENT DOCUMENTS

| | | | | |
|---|---|---|---|---|
| 9,485,527 | B2* | 11/2016 | Ansley | H04N 21/6125 |
| 2006/0215752 | A1 | 9/2006 | Lee et al. | |
| 2010/0166058 | A1* | 7/2010 | Perlman | A63F 13/12 |
| | | | | 375/240.02 |
| 2011/0158558 | A1 | 6/2011 | Zhao et al. | |
| 2013/0083843 | A1* | 4/2013 | Bennett | H04N 19/12 |
| | | | | 375/240.02 |
| 2013/0202273 | A1* | 8/2013 | Ouedraogo | H04N 9/79 |
| | | | | 386/280 |
| 2014/0199043 | A1* | 7/2014 | Guntur | H04N 21/4728 |
| | | | | 386/230 |
| 2015/0172688 | A1* | 6/2015 | Maeda | H04N 19/436 |
| | | | | 375/240.26 |
| 2015/0373341 | A1* | 12/2015 | Davies | H04N 19/187 |
| | | | | 375/240.02 |
| 2016/0029091 | A1* | 1/2016 | Le Floch | H04N 21/234345 |
| | | | | 375/240.26 |
| 2016/0165233 | A1* | 6/2016 | Liu | G06T 11/60 |
| | | | | 382/251 |
| 2016/0165309 | A1* | 6/2016 | Van Brandenburg | |
| | | | | H04N 21/4728 |
| | | | | 725/116 |
| 2016/0182927 | A1* | 6/2016 | Denoual | H04N 21/23434 |
| | | | | 725/109 |
| 2017/0111661 | A1* | 4/2017 | Boyce | H04N 19/44 |
| 2018/0213015 | A1* | 7/2018 | Jain | H04N 21/23439 |

FOREIGN PATENT DOCUMENTS

| | | |
|---|---|---|
| CN | 103517073 A | 1/2014 |
| EP | 2621171 A1 | 7/2013 |
| EP | 3094063 A1 | 11/2016 |

OTHER PUBLICATIONS

Machine Translation and Abstract of Chinese Publication No. CN103179405, Jun. 26, 2013, 13 pages.

Machine Translation and Abstract of Chinese Publication No. CN103517073, Jan. 15, 2014, 26 pages.

Ott, J., et al., "Extended RTP Profile for Real-time Transport Control Protocol (RTCP)-Based Feedback (RTP/AVPF)," RFC 4585, Jul. 2006, 51 pages.

Wenger, S., et al., "Codec Control Messages in the RTP Audio-Visual Profile with Feedback (AVPF)," RFC 5104, Feb. 2008, 64 pages.

Intel, "New Work Item on Video Enhancements by Region-of-Interest Information Signalling," Tdoc S4-140468, Apr. 7-11, 2014, 5 pages.

"Series H: Audiovisual and Multimedia Systems, Infrastructure of audiovisual services—Coding of moving video, Advanced video coding for generic audiovisual services," ITU-T, H.264, Feb. 2014, 790 pages.

Foreign Communication From a Counterpart Application, PCT Application No. PCT/CN2015/092104, English Translation of International Search Report dated Jan. 27, 2016, 2 pages.

Foreign Communication From a Counterpart Application, PCT Application No. PCT/CN2015/092104, English Translation of Written Opinion dated Jan. 27, 2016, 7 pages.

Mavlankar, A., et al., "Video Streaming with Interactive Pan/Tilt/Zoom," XP055359576, Digital Video and Audio Broadcasting Technology: A Practical Engineering Guide, 3rd Edition, Jan. 2010, 26 pages.

Mavlankar, A., et al., "An Interactive Region-of-Interest Video Streaming Systems for Online Lecture Viewing," Proceedings of IEEE 18th International Packet Video Workshop, Dec. 13-14, 2010, 8 pages.

Huawei, "Requirements of proximity ROI," S4-141239, 3GPP TSG-SA4 Meeting #81, Nov. 3-7, 2014, 5 pages.

Huawei, "Proposed Solutions for Proximity ROI," S4-150109, 3GPP TSG-SA4 Meeting #82, Jan. 26-30, 2015, 8 pages.

Foreign Communication From a Counterpart Application, European Application No. 15851741.7, Extended European Search Report dated Aug. 2, 2017, 14 pages.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                              SSRC                             |
+-+-+-+-+-+-+-+-+-+-+-+-+-+-+-+-+-+-+-+-+-+-+-+-+-+-+-+-+-+-+-+-+
|   ROI_Info    |  NearROI_flag |  NearROI_Perce...|  Reserved  |
+-+-+-+-+-+-+-+-+-+-+-+-+-+-+-+-+-+-+-+-+-+-+-+-+-+-+-+-+-+-+-+-+
```
FIG. 3B
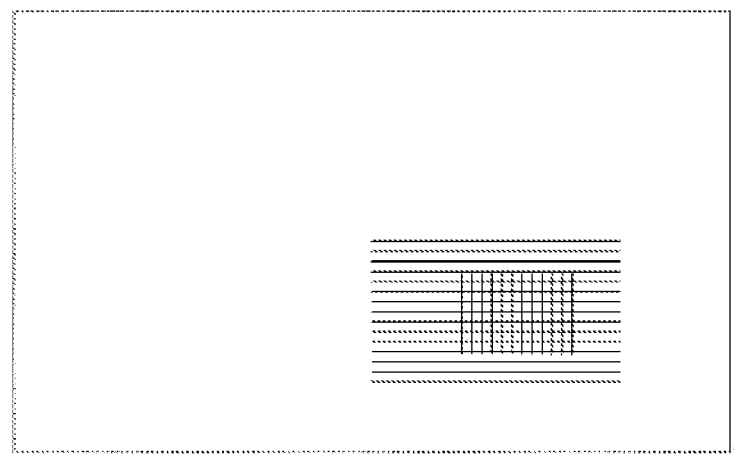
FIG. 3C
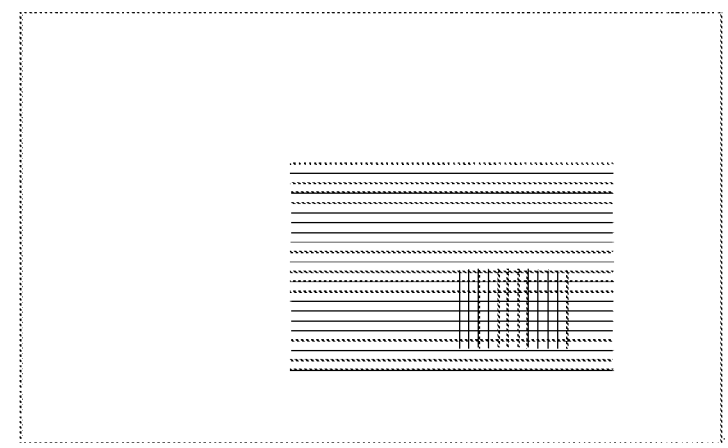
FIG. 3D

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                             SSRC                              |
+-+-+-+-+-+-+-+-+-+-+-+-+-+-+-+-+-+-+-+-+-+-+-+-+-+-+-+-+-+-+-+-+
|ROI_Result    |NearROI_Number| Reserved                        |
+-+-+-+-+-+-+-+-+-+-+-+-+-+-+-+-+-+-+-+-+-+-+-+-+-+-+-+-+-+-+-+-+
|Near_ROI_ID   |Near_ROI_Prio...|Near_ROI_Acti...|Reserved      |
+-+-+-+-+-+-+-+-+-+-+-+-+-+-+-+-+-+-+-+-+-+-+-+-+-+-+-+-+-+-+-+-+
|Near_ROI_ID   |Near_ROI_Prio...|Near_ROI_Acti...|Reserved      |
+-+-+-+-+-+-+-+-+-+-+-+-+-+-+-+-+-+-+-+-+-+-+-+-+-+-+-+-+-+-+-+-+
|Near_ROI_ID   |Near_ROI_Prio...|Near_ROI_Acti...|Reserved      |
+-+-+-+-+-+-+-+-+-+-+-+-+-+-+-+-+-+-+-+-+-+-+-+-+-+-+-+-+-+-+-+-+
```

FIG. 3G

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                             SSRC                              |
+-+-+-+-+-+-+-+-+-+-+-+-+-+-+-+-+-+-+-+-+-+-+-+-+-+-+-+-+-+-+-+-+
| Near_ROI_ID  | Reserved                                       |
+-+-+-+-+-+-+-+-+-+-+-+-+-+-+-+-+-+-+-+-+-+-+-+-+-+-+-+-+-+-+-+-+
```

FIG. 3H

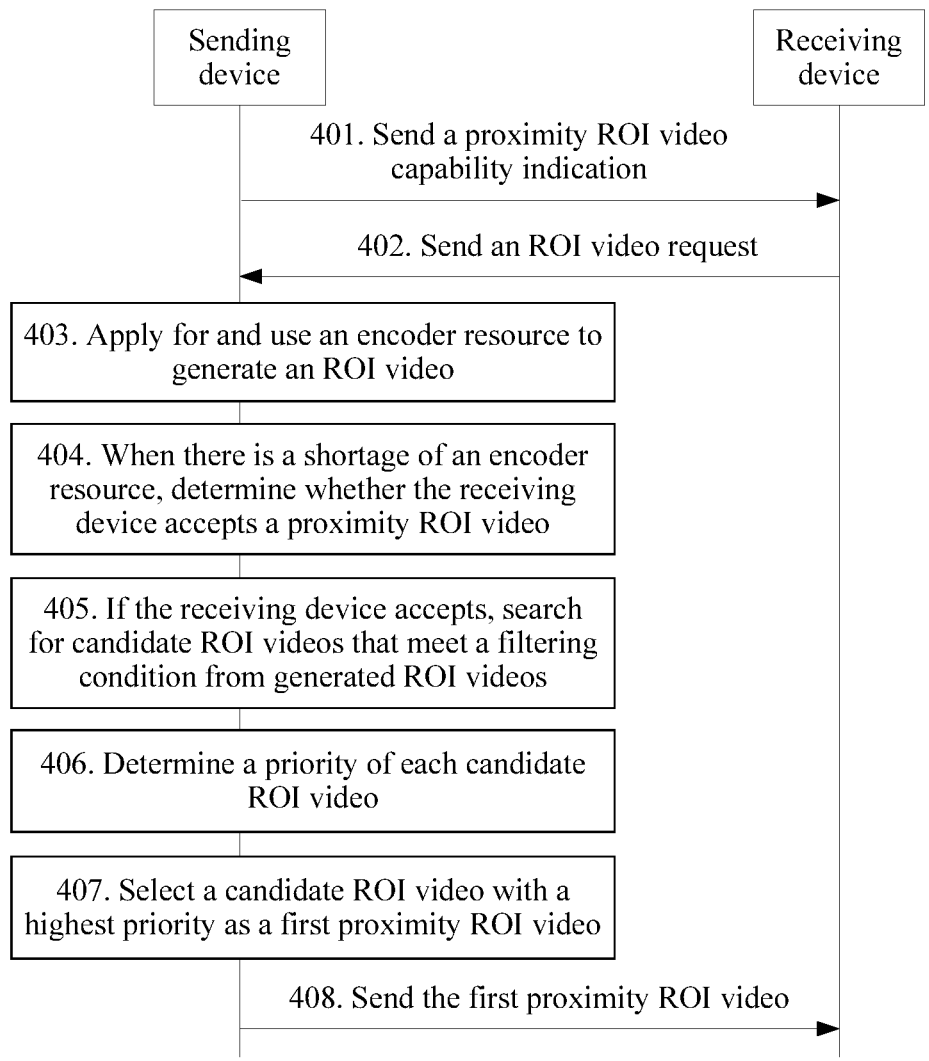

ROI VIDEO IMPLEMENTATION METHOD AND APPARATUS

CROSS-REFERENCE TO RELATED APPLICATIONS

This application is a continuation of International Patent Application No. PCT/CN2015/092104, filed on Oct. 16, 2015, which claims priority to Chinese Patent Application No. 201410562144.6, filed on Oct. 21, 2014, both of which are hereby incorporated by reference in their entireties.

TECHNICAL FIELD

The present disclosure relates to the communications field, and in particular, to a region of interest (ROI) video implementation method and apparatus.

BACKGROUND

With a continuous increase of bandwidth and development of multimedia technologies, a video communications technology plays an increasingly important role in daily life. People know more about and are familiar with a video call, remote monitoring, a video conference, and the like. Accordingly, various types of experience based on the video communications technology is improved, and an ROI technology is an important aspect thereof.

When the ROI technology is used for video communication, a sending device may send an original video with a relatively wide image view to a receiving device. When the receiving device is interested in only a partial image region in the original video, that is, a target region, the receiving device may send an ROI video request to the sending device, to notify the sending device of the target region. After receiving the ROI video request, the sending device generates, using an encoder on a basis of the original video, an ROI video that includes only the target region, and then sends the ROI video to the receiving device. The receiving device displays the received ROI video. The sending device may generate, by means of interaction between the sending device and the receiving device, the ROI video according to the ROI video request sent by the receiving device. The ROI video includes only the target region that a user of the receiving device is interested in, so that an individual requirement of the user for a video provided by a video communication service can be met.

In many video communications systems, there is a one-to-many relationship between sending devices and receiving devices. A same sending device needs to generate different ROI videos for multiple receiving devices. For example, in a remote monitoring system of a kindergarten, a monitoring device usually needs to provide monitoring videos for multiple parents. However, a particular quantity of encoder resources are required for generating each ROI video. To meet each ROI video request, a sending device needs to generate an ROI video using a particular quantity of encoder resources. That is, a particular quantity of encoder resources are required by the sending device to meet each ROI request. If an encoder resource amount is limited, the sending device can simultaneously generate only a limited quantity of ROI videos, that is, the sending device can simultaneously meet only a limited quantity of ROI video requests. It can be learned that, in the prior art, a quantity of ROI video requests that can be simultaneously met by a sending device is limited by an encoder resource amount.

SUMMARY

Embodiments of the present disclosure provide an ROI video implementation method and apparatus, to resolve a problem that a quantity of ROI video requests that can be simultaneously met by a sending device is limited by an encoder resource amount.

According to a first aspect, an embodiment of the present disclosure provides an ROI video request processing method, and the method includes obtaining an ROI video request sent by a receiving device; selecting a first proximity ROI video from proximity ROI videos, where the proximity ROI videos are generated ROI videos that include at least a partial region in a target region indicated by the ROI video request; and sending the first proximity ROI video to the receiving device.

With reference to the first aspect, in a first possible implementation manner of the first aspect, the selecting a first proximity ROI video from proximity ROI videos includes selecting the first proximity ROI video from the proximity ROI videos when there is a shortage of an encoder resource.

With reference to the first aspect or the first possible implementation manner of the first aspect, in a second possible implementation manner of the first aspect, the selecting a first proximity ROI video from proximity ROI videos includes selecting the first proximity ROI video from the proximity ROI videos when it is determined that the receiving device accepts a proximity ROI video.

With reference to the first aspect, the first possible implementation manner of the first aspect, or the second possible implementation manner of the first aspect, in a third possible implementation manner of the first aspect, the selecting a first proximity ROI video from proximity ROI videos includes selecting the first proximity ROI video from candidate ROI videos, where the candidate ROI videos are proximity ROI videos that meet a filter condition.

With reference to the third possible implementation manner of the first aspect, in a fourth possible implementation manner of the first aspect, the selecting the first proximity ROI video from the candidate ROI videos includes determining a priority of each of the candidate ROI videos; and selecting a candidate ROI video with a highest priority as the first proximity ROI video.

With reference to the fourth possible implementation manner of the first aspect, in a fifth possible implementation manner of the first aspect, the determining a priority of each of the candidate ROI videos includes determining the priority of each of the candidate ROI videos according to an effective image ratio, where the effective image ratio is a ratio of an area of an overlapped region to an area of a proximity region, the proximity region is an image region of the candidate ROI video, and the overlapped region is an overlapped part between the target region indicated by the ROI video request and the image region of the candidate ROI video; or determining the priority of each of the candidate ROI videos according to an available image ratio, where the available image ratio is a ratio of the area of the overlapped region to an area of the target region.

With reference to the third possible implementation manner of the first aspect, in a sixth possible implementation manner of the first aspect, the selecting the first proximity ROI video from the candidate ROI videos includes generating selection information corresponding to each of the candidate ROI videos; sending the selection information to the receiving device; and selecting, as the first proximity ROI video, a candidate ROI video selected by the receiving device according to the selection information.

With reference to the sixth possible implementation manner of the first aspect, in a seventh possible implementation manner of the first aspect, the generating selection information corresponding to each of the candidate ROI videos includes generating the selection information corresponding to each of the candidate ROI videos, where each piece of the selection information includes an effective image ratio of a candidate ROI video corresponding to the selection information.

With reference to any one of the third to the fifth possible implementation manners of the first aspect, in an eighth possible implementation manner of the first aspect, the method further includes selecting a second proximity ROI video from the candidate ROI videos after a proximity ROI video change request sent by the receiving device is obtained; and sending the second proximity ROI video to the receiving device.

With reference to any one of the third to the fifth possible implementation manners of the first aspect, in a ninth possible implementation manner of the first aspect, the method further includes selecting a third proximity ROI video from the candidate ROI videos if the first proximity ROI video becomes invalid in a process of sending the first proximity ROI video to the receiving device; and sending the third proximity ROI video to the receiving device.

According to a second aspect, an embodiment of the present disclosure provides an ROI video request processing apparatus, and the apparatus includes an obtaining unit configured to obtain an ROI video request sent by a receiving device; a selection unit configured to select a first proximity ROI video from proximity ROI videos, where the proximity ROI videos are generated ROI videos that include at least a partial region in a target region indicated by the ROI video request obtained by the obtaining unit; and a sending unit configured to send the first proximity ROI video selected by the selection unit to the receiving device.

With reference to the second aspect, in a first possible implementation manner of the second aspect, the selection unit is configured to select the first proximity ROI video from the proximity ROI videos when there is a shortage of an encoder resource.

With reference to the second aspect or the first possible implementation manner of the second aspect, in a second possible implementation manner of the second aspect, the selection unit is configured to select the first proximity ROI video from the proximity ROI videos when determining that the receiving device accepts a proximity ROI video.

With reference to the second aspect, the first possible implementation manner of the second aspect, or the second possible implementation manner of the second aspect, in a third possible implementation manner of the second aspect, the selection unit is configured to select the first proximity ROI video from candidate ROI videos, where the candidate ROI videos are proximity ROI videos that meet a filter condition.

With reference to the third possible implementation manner of the second aspect, in a fourth possible implementation manner of the second aspect, the selection unit includes a priority determining subunit configured to determine a priority of each of the candidate ROI videos; and a first selection subunit configured to select a candidate ROI video with a highest priority as the first proximity ROI video.

With reference to the fourth possible implementation manner of the second aspect, in a fifth possible implementation manner of the second aspect, the priority determining subunit is configured to determine the priority of each of the candidate ROI videos according to an effective image ratio, where the effective image ratio is a ratio of an area of an overlapped region to an area of a proximity region, the proximity region is an image region of the candidate ROI video, and the overlapped region is an overlapped part between the target region indicated by the ROI video request and the image region of the candidate ROI video; or determine the priority of each of the candidate ROI videos according to an available image ratio, where the available image ratio is a ratio of the area of the overlapped region to an area of the target region.

With reference to the third possible implementation manner of the second aspect, in a sixth possible implementation manner of the second aspect, the selection unit includes a selection information generation subunit configured to generate selection information corresponding to each of the candidate ROI videos; a selection information sending subunit configured to send the selection information to the receiving device; and a second selection subunit configured to select, as the first proximity ROI video, a candidate ROI video selected by the receiving device according to the selection information.

With reference to the sixth possible implementation manner of the second aspect, in a seventh possible implementation manner of the second aspect, the selection information generation subunit is configured to generate the selection information corresponding to each of the candidate ROI videos, where each piece of the selection information includes an effective image ratio of a candidate ROI video corresponding to the selection information.

With reference to any one of the third to the fifth possible implementation manners of the second aspect, in an eighth possible implementation manner of the second aspect, the selection unit is further configured to select a second proximity ROI video from the candidate ROI videos after a proximity ROI video change request sent by the receiving device is obtained; and the sending unit is further configured to send the second proximity ROI video to the receiving device.

With reference to any one of the third to the fifth possible implementation manners of the second aspect, in a ninth possible implementation manner of the second aspect, the selection unit is further configured to select a third proximity ROI video from the candidate ROI videos when the first proximity ROI video becomes invalid in a process of sending the first proximity ROI video to the receiving device; and the sending unit is further configured to send the third proximity ROI video to the receiving device.

In the embodiments of the present disclosure, an ROI video request sent by a receiving device is obtained. A first proximity ROI video is selected from proximity ROI videos, and the proximity ROI videos are generated ROI videos that include at least a partial region in a target region indicated by the ROI video request. The first proximity ROI video is sent to the receiving device. According to the present disclosure, when receiving an ROI video request, a sending device may select a proximity ROI video from generated ROI videos, and send the proximity ROI video to a receiving device. The proximity ROI video is a generated video, and therefore, according to the present disclosure, the ROI video request can be met without consuming an encoder resource, so as to break through limitation caused by an encoder resource amount to a quantity of ROI video requests that can be simultaneously met by the sending device.

BRIEF DESCRIPTION OF THE DRAWINGS

To describe the technical solutions in the embodiments of the present disclosure more clearly, the following briefly describes the accompanying drawings required for describing the embodiments or the prior art. A person of ordinary skill in the art may still derive other drawings from these accompanying drawings without creative efforts.

FIG. 3B is a schematic diagram of an information format of an ROI video request in the present disclosure;

FIG. 3C, FIG. 3D, FIG. 3E, and FIG. 3F are schematic diagrams of proximity ROI video determining manners in the present disclosure;

FIG. 3G is a schematic diagram of an information format of a first selection information group in the present disclosure;

FIG. 3H is a schematic diagram of an information format of a switchover instruction in the present disclosure;

FIG. 3K is a schematic diagram of an information format of a receiving response in the present disclosure;

FIG. 4A is a flowchart of an ROI video implementation method according to another embodiment of the present disclosure;

DETAILED DESCRIPTION

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
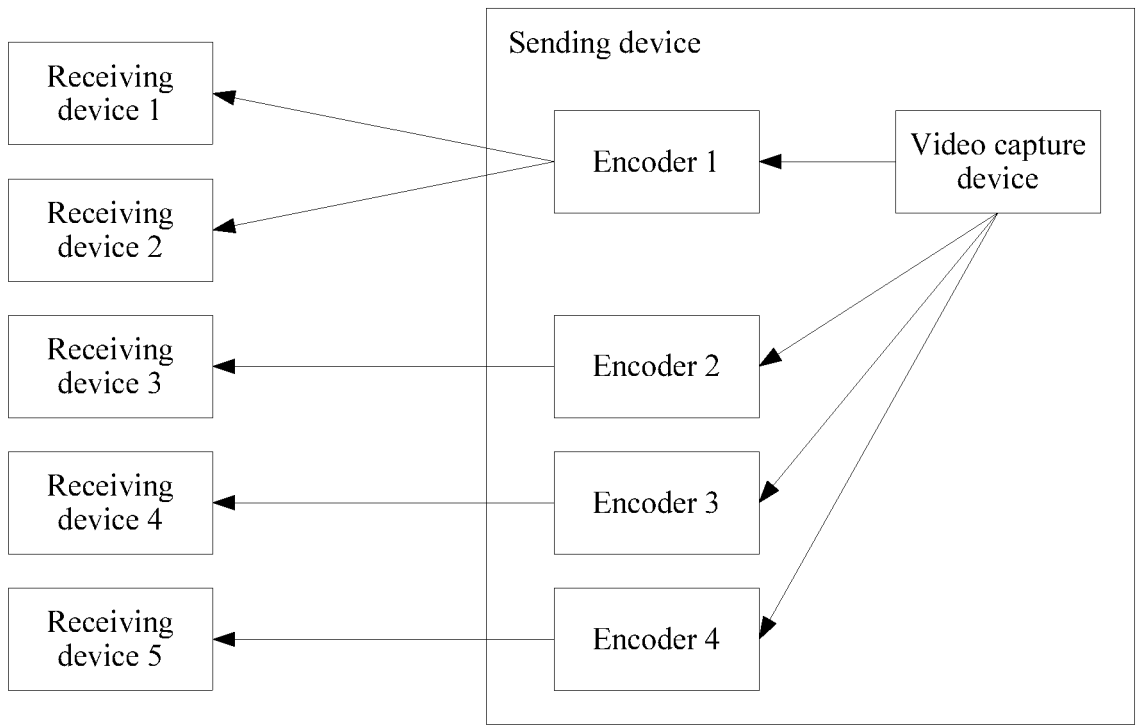
FIG. 1 is a schematic structural diagram of an ROI video communication service system in the present disclosure.

As shown in FIG. 1, an ROI video communication service system generally includes a sending device and a receiving device.

The sending device may generally include a video capture device such as a camera, multiple encoders, and other hardware and software that are necessary for implementing an ROI video communication service. The video capture device is configured to obtain original image data, and send the original image data to each encoder according to a requirement. At least one encoder in the multiple encoders is configured to generate an original video according to the original image data. Except the encoder that is configured to generate the original video according to the original image data, the other encoders are configured to generate an ROI video according to an ROI video request. Generally, encoders are not one-to-one corresponding to receiving devices, and a quantity of encoders is generally less than a quantity of receiving devices. A same encoder may generate ROI videos for different receiving devices at different time. ROI videos received by a same receiving device at different time may also be generated by different encoders.

For example, in a kindergarten monitoring system shown in FIG. 1, a sending device provides four encoders. An encoder 1 is fixedly configured to generate an original image, and an encoder 1 to an encoder 4 are configured to generate an ROI image.

A receiving device 1 to a receiving device 5 respectively represent five parents. The receiving device 1 and the receiving device 2 are currently watching an original video. The receiving device 3, the receiving device 4, and the receiving device 5 are watching ROI videos that are focused on children of these three parents. When the receiving device 1 sends a request to request the sending device to generate an ROI video that is focused on a child of this parent, there is a shortage of an encoder resource, and therefore, the sending device cannot generate the ROI video according to the request of the receiving device 1, and can only reject the ROI video request of the receiving device 1 and continue to provide the original video for the receiving device 1.

Figure 2:
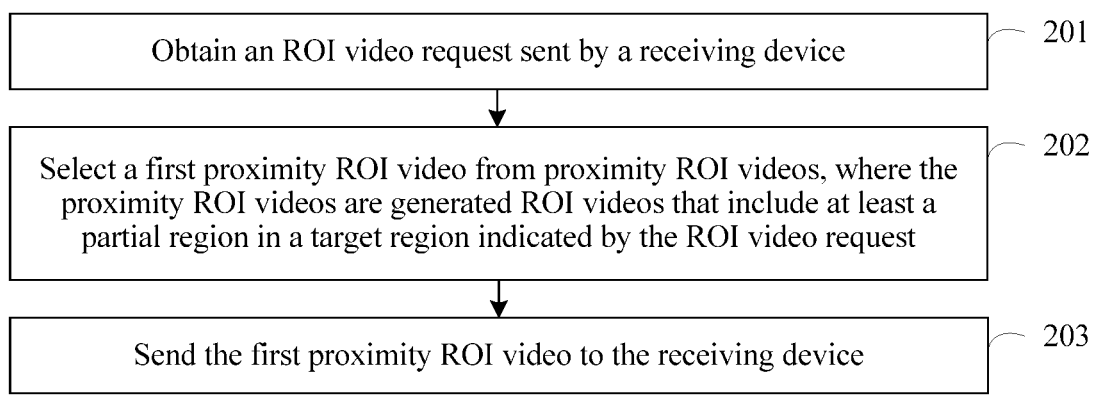
FIG. 2 is a flowchart of an ROI video implementation method according to an embodiment of the present disclosure.

Referring to FIG. 2, FIG. 2 is a flowchart of an ROI video implementation method according to an embodiment of the present disclosure. The method includes the following steps.

Step 201: Obtain an ROI video request sent by a receiving device.

A sending device first obtains the ROI video request sent by the receiving device. The receiving device indicates a target region using the ROI video request, and the target region may be determined by the receiving device according to a user's operation.

Before receiving the ROI video request, the sending device may first establish a video transmission connection to the receiving device, and send an original video to the video receiving device, so that the receiving device determines the target region according to the original video, and then generates the ROI video request.

Step 202: Select a first proximity ROI video from proximity ROI videos, where the proximity ROI videos are generated ROI videos that include at least a partial region in a target region indicated by the ROI video request.

Before selecting the first proximity ROI video from the proximity ROI videos, the sending device may further determine whether a predetermined condition of selecting the first proximity video is met. The first proximity ROI video is selected from the proximity ROI videos only when the predetermined condition is met.

In a possible implementation manner, after receiving the ROI video request, the sending device may determine whether a predetermined condition of selecting the first proximity video is met. When the predetermined condition is met, the first proximity ROI video is selected from the proximity ROI videos. For example, after receiving the ROI video request, the sending device may determine whether there is a shortage of an encoder resource. If there is a shortage of an encoder resource, the first proximity ROI video is selected from the generated ROI videos. The shortage of an encoder resource includes the following cases. There is no available encoder resource; or although there are available encoder resources, these resources are reserved (for example, reserved for a very important person (VIP) user) and cannot be provided for this ROI request. Certainly, this is not limited to these cases.

In another possible implementation manner, before receiving the ROI video request, the sending device may predetermine whether a predetermined condition of selecting the first proximity video is met. If that the predetermined condition is met is predetermined, the first proximity ROI video is selected from the proximity ROI videos if the ROI video request is received. For example, the sending device may predetermine whether there is a shortage of an encoder resource. If there is a shortage of an encoder resource, the sending device selects the first proximity ROI video from the generated ROI videos if the sending device receives the ROI video request. The shortage of an encoder resource includes the following cases. There is no available encoder resource; or although there are available encoder resources, these resources are reserved (for example, reserved for a VIP user) and cannot be provided for this ROI request. Certainly, this is not limited to these cases.

Specific content of the predetermined condition may be set according to a requirement, and may include whether there is a shortage of an encoder resource of the sending device, that the receiving device accepts a proximity ROI video, or the like. That the receiving device accepts a proximity ROI video indicates that the receiving device is capable of accepting a proximity ROI video, and is willing to accept a proximity ROI video.

For ease of description, in the following, an original region is used to indicate an image region of the original video, a target region is used to indicate the target region indicated by the ROI video request, and a proximity region is used to indicate an image region of a proximity ROI video. An overlapped region is used to indicate an overlapped region between the proximity region and the target region. Both the proximity region and the target region are a part of the original region. The overlapped region is not only a part of the target region, but also a part of the proximity region.

A ratio of an area of an overlapped region in a proximity ROI video to an area of the target region is an available image ratio of the proximity ROI video. A ratio of the area of the overlapped region in the proximity ROI video to an area of a proximity region of the proximity ROI video is an effective image ratio of the proximity ROI video. If the available image ratio is excessively small, the proximity ROI video includes only little content that the user of the receiving device is interested in, and therefore, the proximity ROI video may not be capable of meeting a requirement of the user of the receiving device. If the effective image ratio is excessively small, image quality of content that the user is interested in is relatively poor, and similarly, the requirement of the user of the receiving device may either not be met.

Therefore, the first proximity ROI video may be one of proximity ROI videos that meet a filter condition. A proximity ROI video that meets the filter condition is referred to as a candidate ROI video. The filter condition refers to a limited condition that a proximity ROI video needs to meet when meeting a requirement of the user of the receiving device for an ROI video. When the first proximity ROI video is being determined, the first proximity ROI video may be selected from the proximity ROI videos that meet the filter condition. The filter condition may be preset by the sending device, or may be sent by the receiving device to the sending device. In actual application, the filter condition may be a minimum available image ratio and/or a minimum effective image ratio, a location of an overlapped region in a proximity region, or the like.

If only one proximity ROI video meets the filter condition, this candidate ROI video may be directly selected as the first ROI video. If multiple proximity ROI videos meet the filter condition, the first ROI video may be selected from candidate ROI videos in a predetermined selection manner. The candidate ROI videos are the proximity ROI videos that meet the filter condition.

When the first ROI video is being selected from multiple candidate ROI videos, priorities of the candidate ROI videos may be first determined, and then a candidate ROI video with a highest priority is selected as the first proximity ROI video. Alternatively, selection information corresponding to each of the candidate ROI videos may be first generated. Then, the selection information is sent to the receiving device, and the receiving device selects the first proximity ROI video from the candidate ROI videos according to the selection information. A priority of a candidate ROI video may be determined according to a value of an available image ratio or a value of an effective image ratio of the candidate ROI video. Selection information corresponding to a candidate ROI video may include a unique identifier of the candidate ROI video, and may further include an available image ratio and an effective image ratio that are corresponding to the candidate ROI video, priority information of the candidate ROI video, and the like.

Step 203: Send the first proximity ROI video to the receiving device.

After the first proximity ROI video is determined, the sending device sends the first proximity ROI video to the receiving device. After receiving the first proximity ROI video, the receiving device displays the first proximity ROI video.

The first proximity ROI video may include only a part of the target region, and probably cannot meet the requirement of the user of the receiving device. Therefore, after receiving the first proximity ROI video, the receiving device may instruct the sending device to send another proximity ROI video. After receiving the instruction, the sending device selects a second proximity ROI video from the obtained candidate ROI videos, and then sends the second proximity ROI video to the receiving device. The second proximity ROI video and the first proximity ROI video are different ROI videos.

In addition, because neither the first proximity ROI video nor the second proximity ROI video is an ROI video that is generated by the sending device according to the ROI video request sent by the current receiving device, in a period in which the ROI video request of the receiving device exists, the sending device may no longer generate the first proximity ROI video or the second proximity ROI video with a change of an ROI video request of another receiving device. Consequently, there may be a case in which the first proximity ROI video or the second proximity ROI video is invalid. When the first proximity ROI video or the second proximity ROI video becomes invalid in a sending process, the sending device may select a third proximity ROI video from the obtained candidate ROI videos, and send the third proximity ROI video to the receiving device.

In this embodiment, an ROI video request sent by a receiving device is obtained. A first proximity ROI video is selected from proximity ROI videos, and the proximity ROI videos are generated ROI videos that include at least a partial region in a target region indicated by the ROI video request. The first proximity ROI video is sent to the receiving device. According to this embodiment, when receiving an ROI video request, a sending device may select a proximity ROI video from generated ROI videos, and send the proximity ROI video to a receiving device. In this way, the ROI video request can be met without consuming an encoder resource, so as to break through limitation caused by an encoder resource amount to a quantity of ROI video requests that can be simultaneously met by the sending device.

Figure 3A:
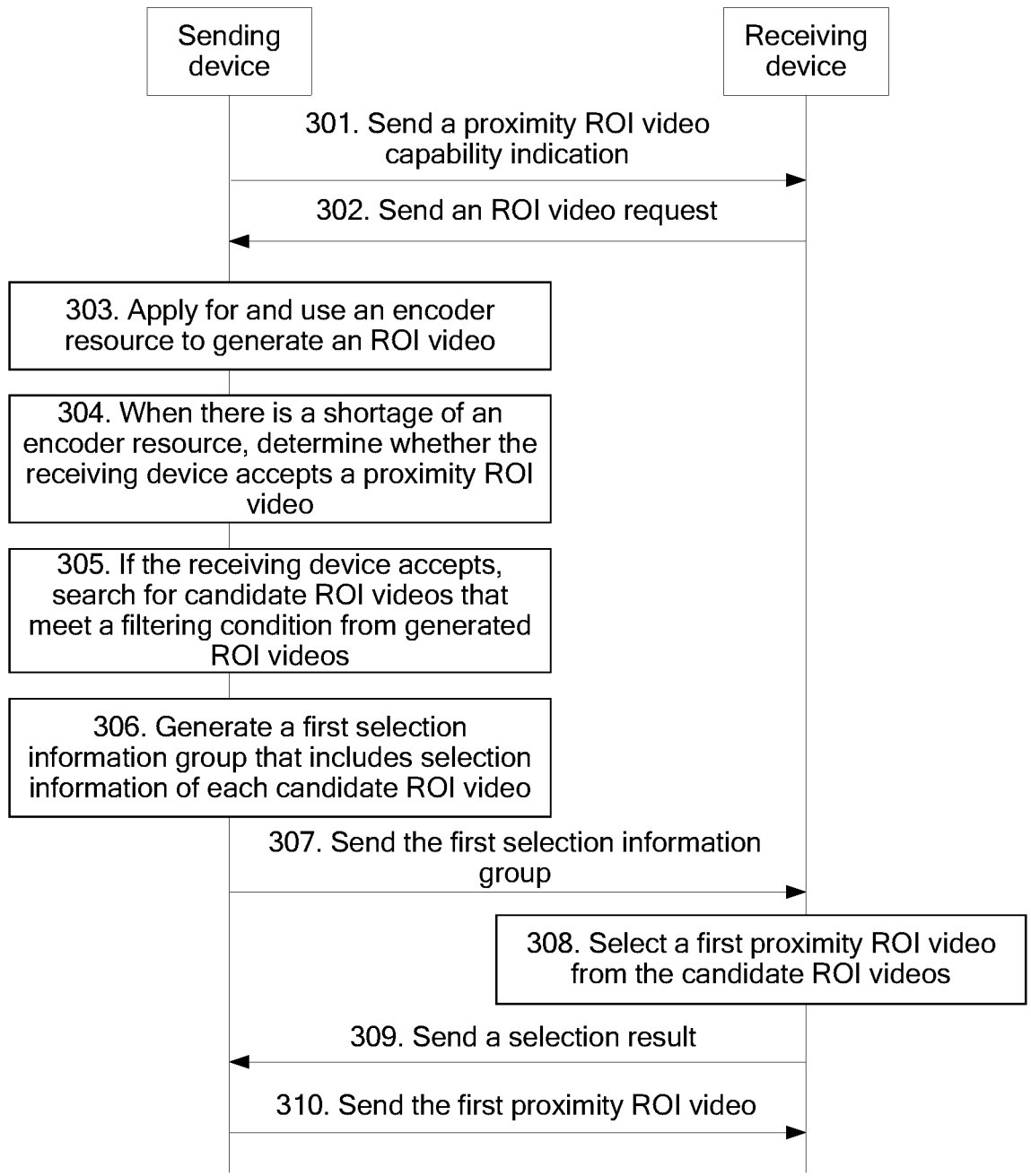
FIG. 3A is a flowchart of an ROI video implementation method according to another embodiment of the present disclosure.

Referring to FIG. 3A, FIG. 3A is a flowchart of an ROI video implementation method according to an embodiment of the present disclosure. The ROI video implementation method in the present disclosure is described in detail in the following with reference to FIG. 3A.

Step 301: A sending device sends a proximity ROI video capability indication to a receiving device.

In a process of establishing a session between the sending device and the receiving device, the sending device sends an ROI video capability indication to the receiving device in a manner in the prior art. The ROI video capability indication is used to indicate that the sending device is capable of sending an ROI video. In addition, the sending device further needs to send the proximity ROI video capability indication to the receiving device. The proximity ROI video capability indication is used to indicate whether the sending device is capable of sending a proximity ROI video.

If the sending device sends only the ROI video capability indication to the receiving device, and does not send the proximity ROI video capability indication to the receiving device, the receiving device may consider by default, according to a convention, that the sending device is capable of sending a proximity ROI video, and step 301 is not performed.

As shown in Table 1, the sending device may indicate, using different values of a NearROI_flag identifier, whether the sending device is capable of sending a proximity ROI video.

TABLE 1

| Content | Identifier | Value range | Remarks |
|---|---|---|---|
| Whether the sending device is capable of sending a proximity ROI video | NearROI_flag | Y (indicates that the sending device is capable of sending a proximity ROI video); N (indicates that the sending device is not capable of sending a proximity ROI video) | Set to Y if a proximity ROI video needs to be processed. |

The sending device may send the proximity ROI video capability indication to the receiving device in a negotiation process of establishing an original video call. A specific manner may be as follows:

```
m=video 49154 RTP/AVPF 99
a=acfg:1 t=1
b=AS:315
b=RS:0
b=RR:2500
a=rtpmap:99 H264/90000
a=fmtp:99 packetization-mode=0; profile-level-id=42e00a; \
    sprop-parameter-sets=J0LgCpWgsToB/UA=,KM4Gag==
a=rtcp-fb:* trr-int 5000
a=rtcp-fb:* nack
a=rtcp-fb:* nack pli
a=rtcp-fb:* ccm tmmbr
a=rtcp-fb:* ccm fir
```

-continued

```
a=ecn-capable-rtp: leap ect=0
a=extmap:4 urn:3gpp:video-orientation
a=ROI: NearROI_flag=Y
a=ROI: NearROI_flag=Y is used to indicate that the sending device
is capable of sending a proximity ROI video.
```

Optionally, step 301 is not a mandatory step.

Step 302: The receiving device sends an ROI video request to the sending device.

After the original video call is established, the receiving device may send the ROI video request to the sending device according to a requirement. After receiving an operation instruction of a user, the receiving device may determine, according to the operation instruction, a region that is in an original region and that the user is interested in. The region that the user is interested in is a target region. After the target region is determined, the receiving device generates the ROI video request. In addition to indicating the target region according to the prior art, the ROI request may further carry an accept indication about whether the receiving device is willing to accept a proximity ROI video.

As shown in Table 2, whether the receiving device accepts a proximity ROI video may be indicated using different values of a NearROI_flag identifier.

TABLE 2

| Content | Identifier | Value range | Remarks |
|---|---|---|---|
| Whether the receiving device supports a proximity ROI video | NearROI_flag | Y (indicates that the receiving device is willing to accept a proximity ROI video); N (indicates that the receiving device is not willing to accept a proximity ROI video) | Set to Y if a proximity ROI video needs to be processed. |

Not all forms of proximity ROI videos can meet the requirement of the user of the receiving device. Therefore, the ROI video request may further carry a filter condition. The filter condition may be determined by the receiving device according to the operation instruction of the user.

The ROI video request may be carried in a real-time control protocol (RTCP) message in a media stream, or may be carried in a session initiation protocol (SIP) message in a signaling plane. When the ROI video request is carried in the RTCP message in the media stream, the RTCP message may be extended with reference to Requests for Comments (RFC) 4585 and RFC5104, an extension type is "Payload-Specific Feedback Messages", and a format of the ROI video request is shown in FIG. 3B. Synchronization source identifier (SSRC) is an RTCP intrinsic parameter. ROI_Info is used to carry information for determining the target region. NearROI_flag is used to indicate whether the receiving device is willing to accept a proximity ROI video. Near-ROI_Perce is used to carry the filter condition.

When the ROI video request is carried in the SIP message in the signaling plane, the ROI video request may be carried using a header field or an extended body of related information such as INFO, UPDATE, or NOTIFY. For example, when the ROI video request is carried using an extended body in an INFO message, a manner is as follows.

INFO sip:8888000@160.28.1.8:5061; user=phone SIP/2.0
......
Content-Type: application/ROI
Type=ROI-Request
ROI_Info=XXXXXXXX
    NearROI_flag=Y (NearROI_flag=Y indicates that the receiving device accepts a proximity ROI video)
    NearROI_Percent_Min=60 (NearROI_Percent_Min=60 indicates that the filter condition is that an available image ratio is at least 60%)

Step 303: After receiving the ROI video request, the sending device applies for and uses an encoder resource to generate an ROI video.

After receiving the ROI video request, the sending device first applies for and uses the encoder resource, so as to generate the ROI video according to the ROI video request. If there are enough encoder resources, and the sending device can generate the ROI video according to the ROI video request, the ROI video is generated using the encoder resource according to the prior art. The generated ROI video is sent to the receiving device.

Step 304: When there is a shortage of an encoder resource, the sending device determines whether the receiving device accepts a proximity ROI video.

If there is a shortage of an encoder resource, and the ROI video cannot be generated according to the ROI video request, the sending device determines whether the receiving device accepts a proximity ROI video. For example, the sending device may determine, using a value of NearROI_flag in the ROI video request, whether the receiving device accepts a proximity ROI video. If the value of NearROI_flag is Y, it indicates that the receiving device is willing to accept a proximity ROI video. If the value of NearROI_flag is N, it indicates that the receiving device is not willing to accept a proximity ROI video. If the ROI video request sent by the receiving device does not include the accept indication, it may be considered by default, according to a convention, that the receiving device accepts a proximity ROI video.

If the receiving device does not accept a proximity ROI video, the sending device sends a message to the receiving device, to notify the receiving device that the sending device cannot provide an ROI video. If it is agreed in advance that the receiving device accepts a proximity ROI video, step 305 may be directly performed without determining whether the receiving device accepts a proximity ROI video.

Step 305: If the receiving device accepts a proximity ROI video, the sending device searches for candidate ROI videos that meet a filter condition from generated ROI videos.

The sending device first determines the filter condition. The filter condition may be pre-saved by the sending device, or may be sent by the receiving device to the sending device using the ROI video request. After the filter condition is determined, the sending device may select by means of filtering, as the candidate ROI videos, proximity ROI videos that meet the filter condition from the generated ROI videos.

Figure 3E:
Figure 3F:
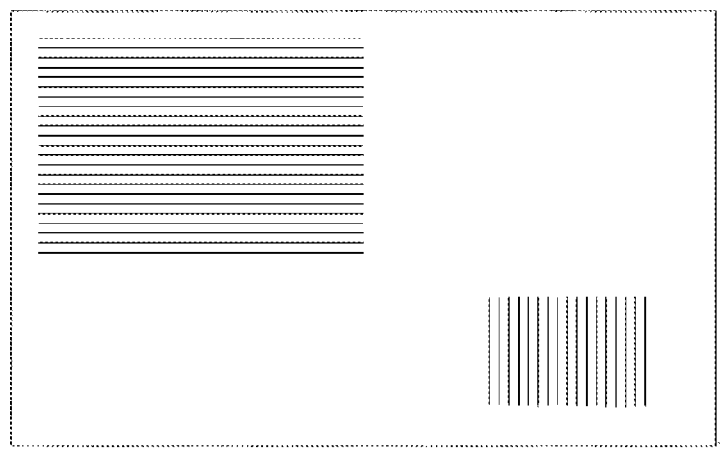

As shown in FIG. 3C to FIG. 3F, vertical stripe regions are target regions indicated by ROI video requests of users, and horizontal stripe regions are proximity regions. In FIG. 3C, FIG. 3D, and FIG. 3E, there are overlapped regions between the horizontal stripe regions and the vertical stripe regions. Therefore, generated ROI videos corresponding to the horizontal stripe regions in FIG. 3C, FIG. 3D, and FIG. 3E may be used as proximity ROI videos. In FIG. 3F, the horizontal stripe region and the vertical stripe region are not overlapped. Therefore, a generated ROI video corresponding to the horizontal stripe region in FIG. 3F cannot be used as a proximity ROI video.

When the filter condition is that an available image ratio is greater than 50%, all the proximity ROI videos corresponding to the proximity regions in FIG. 3C, FIG. 3D, and FIG. 3E may be used as candidate ROI videos. When the filter condition is that an available image ratio is greater than 90%, the proximity ROI videos corresponding to the proximity regions in FIG. 3C and FIG. 3D may be used as candidate ROI videos, but the proximity ROI video corresponding to the proximity region in FIG. 3E cannot be used as a candidate ROI video.

Step 306: The sending device generates a first selection information group that includes selection information of each candidate ROI video.

The first selection information group may include the selection information of each candidate ROI video. The selection information of each candidate ROI video may include a unique ID of the candidate ROI video, may include a priority of the candidate ROI video, and if necessary, may further include information such as real-time image information captured from the candidate ROI video, an available image ratio and an effective image ratio of the candidate ROI video, and relative locations of an overlapped region and a proximity region. Selection information of a candidate ROI video may be indicated in a form in Table 3.

TABLE 3

| Content | Identifier | Value range | Remarks |
|---|---|---|---|
| Unique identifier of the candidate ROI video | Near_ROI_ID | Numbers 1 to 255 | Unique in a session. 255 indicates that the candidate ROI video is an original video. |
| Priority of the candidate ROI video | Near_ROI_Priority | Numbers 1 to 255 | Unique in a session; and a smaller number indicates a higher priority. 255 indicates a lowest priority and corresponds to the original video. |
| Whether the candidate ROI video is an ROI video that is being currently sent | Near_ROI_Active_Flag | Y indicates that the candidate ROI video is an ROI video stream that is being currently sent; N indicates that the candidate ROI video is not an ROI video that is being currently sent. | Only one candidate ROI video can have the field value Y at a same time point. |

In actual use, there may be no available encoder resource, and no candidate ROI video. Therefore, the first selection information group may further include quantity information of the candidate ROI videos. The sending device notifies, using the quantity information of the candidate ROI videos, the receiving device whether there is a candidate ROI video, so that the receiving device performs further processing, to prevent the receiving device from being in a wait state for a long time after the ROI video request is sent.

As shown in Table 4, a value of ROI_Result may be used to indicate a filtering result. A value of NearROI_Number is used to indicate a quantity of candidate ROI videos.

TABLE 4

| Content | Identifier | Value range | Remarks |
|---|---|---|---|
| Filtering result | ROI_Result | 0 indicates that there is no available encoder resource; 1 indicates that there is no candidate ROI video; 2 indicates that there is a candidate ROI video. | None |
| Candidate ROI video | NearROI_Number | Numbers 1 to 255 | None |

Step 307: The sending device sends the first selection information group to the receiving device.

After the first selection information group is generated, the sending device may send the first selection information group to the receiving device.

When the sending device sends the first selection information group, the first selection information group may be carried in an RTCP message in a media stream, or may be carried in a SIP message in a signaling plane.

When the first selection information group is carried in the RTCP message in the media stream, the RTCP message may be extended with reference to RFC4585 and RFC5104, an extension type is "Payload-Specific Feedback Messages", and a format corresponding to a current message NewNearROIGroup_Request is shown in FIG. 3G. SSRC is an RTCP intrinsic parameter.

When the first selection information group is carried in the SIP message in the signaling plane, the ROI video request may be carried using a header field or an extended body of related information such as INFO, UPDATE, or NOTIFY. A manner of carrying the first selection information group using an extended body in a 200 (INFO) message is used as an example for description in the following.

SIP/2.0 200 OK
......
......
Content-Type: application/ROI
Type=ROI-Response
ROI_Result=2
NearROI_Number=3
Near_ROI_ID=1; Near_ROI_Priority=10; Near_ROI_Active_Flag=Y
Near_ROI_ID=2; Near_ROI_Priority=15; Near_ROI_Active_Flag=N
Near_ROI_ID=255; Near_ROI_Priority=255;
Near_ROI_Active_Flag=N The sending device may further save the first selection information group, so as to use the first selection information group again when there is a requirement.

Step 308: The receiving device selects a first proximity ROI video from the candidate ROI videos according to the first selection information group.

After receiving the first selection information group, the receiving device saves the first selection information group, and selects, from the candidate ROI videos, a candidate ROI video as the first proximity ROI video according to the selection information in the first selection information group. For example, when the first selection information group includes priority information of all the candidate ROI videos, the receiving device may select, according to the priority information of all the candidate ROI videos that is included in the first selection information group, a candidate ROI video with a highest priority as the first proximity ROI video. When the first selection information group includes available image ratios of all the candidate ROI videos, a candidate ROI video with a highest available image ratio may be selected as the first proximity ROI video according to the available image ratios of all the candidate ROI videos. Alternatively, when the first selection information group includes effective image ratios of all the candidate ROI videos, a candidate ROI video with a highest effective image ratio may be selected as the first proximity ROI video according to the effective image ratios of all the candidate ROI videos.

Step 309: The receiving device sends a selection result to the sending device, where the selection result is used to instruct the sending device to send the first proximity ROI video to the receiving device.

After selecting the first proximity ROI video, the receiving device sends the selection result to the sending device. For example, after selecting a candidate ROI video as the first proximity ROI video, the receiving device may send an ID of the candidate ROI video to the sending device, to instruct the sending device to send the candidate ROI video corresponding to the ID.

The selection result may be carried in an RTCP message in a media stream, or may be carried in a SIP message in a signaling plane.

When the selection result is carried in the RTCP message in the media stream, the RTCP message may be extended with reference to RFC4585 and RFC5104, an extension type is "Payload-Specific Feedback Messages", and a format corresponding to a current message NearROIExchange_Request is shown in FIG. 3H. Near_ROI_ID is an ID of a candidate ROI video to which the receiving device is about to switch.

When the selection result is carried in the SIP message in the signaling plane, the ROI video request may be carried using a header field or an extended body of related information such as INFO, UPDATE, or NOTIFY. A manner of carrying the selection result using an extended body in an INFO message is used as an example for description.

INFO sip:8888000@160.28.1.8:5061; user=phone SIP/2.0
......
Content-Type: application/ROI
Type=NearROIExchange-Request
Near_ROI_ID=2 (the selection result is a candidate ROI video whose ID is 2)
Step 310: The sending device sends the first proximity ROI video to the receiving device.

After receiving the selection result sent by the receiving device, the sending device determines the first proximity ROI video according to the selection result. For example, when the selection result includes an ID of a candidate ROI video, the sending device may select, as the first proximity ROI video, the candidate ROI video corresponding to the ID.

Because the candidate ROI videos may constantly change, the candidate ROI video selected by the receiving device as the first proximity ROI video may be invalid when the sending device receives the selection result. Consequently, the sending device cannot send the first proximity ROI video to the receiving device. Therefore, after receiving the selection result, the sending device first determines whether the first proximity ROI video selected by the receiving device can be sent, and then notifies the receiving device of a determining result using a selection response, to prevent the receiving device from being in a wait state for indefinite duration if the sending device cannot send the first proximity ROI video. If the first proximity ROI video can be sent, a selection response that includes affirmative information is sent, to indicate that the first proximity ROI video can be sent. If the first proximity ROI video cannot be sent, a selection response that includes negative information is sent, to indicate that the first proximity ROI video cannot be sent.

If the sending device can send the first proximity ROI video to the receiving device, the sending device sends the first proximity ROI video to the receiving device after completing sending the selection response.

According to this embodiment, when a sending device cannot generate an ROI video according to an ROI video request, a receiving device may select, from generated ROI videos, an ROI video as a first proximity ROI video by means of interaction between the sending device and the receiving device, and the sending device sends the first proximity ROI video to the receiving device. In this way, the ROI video request can be met without consuming an encoder resource, so as to break through limitation caused by an encoder resource amount to a quantity of ROI video requests that can be simultaneously met by the sending device. Therefore, a problem that the ROI video request cannot be met because of a shortage of an encoder resource can be avoided.

Figure 3I:
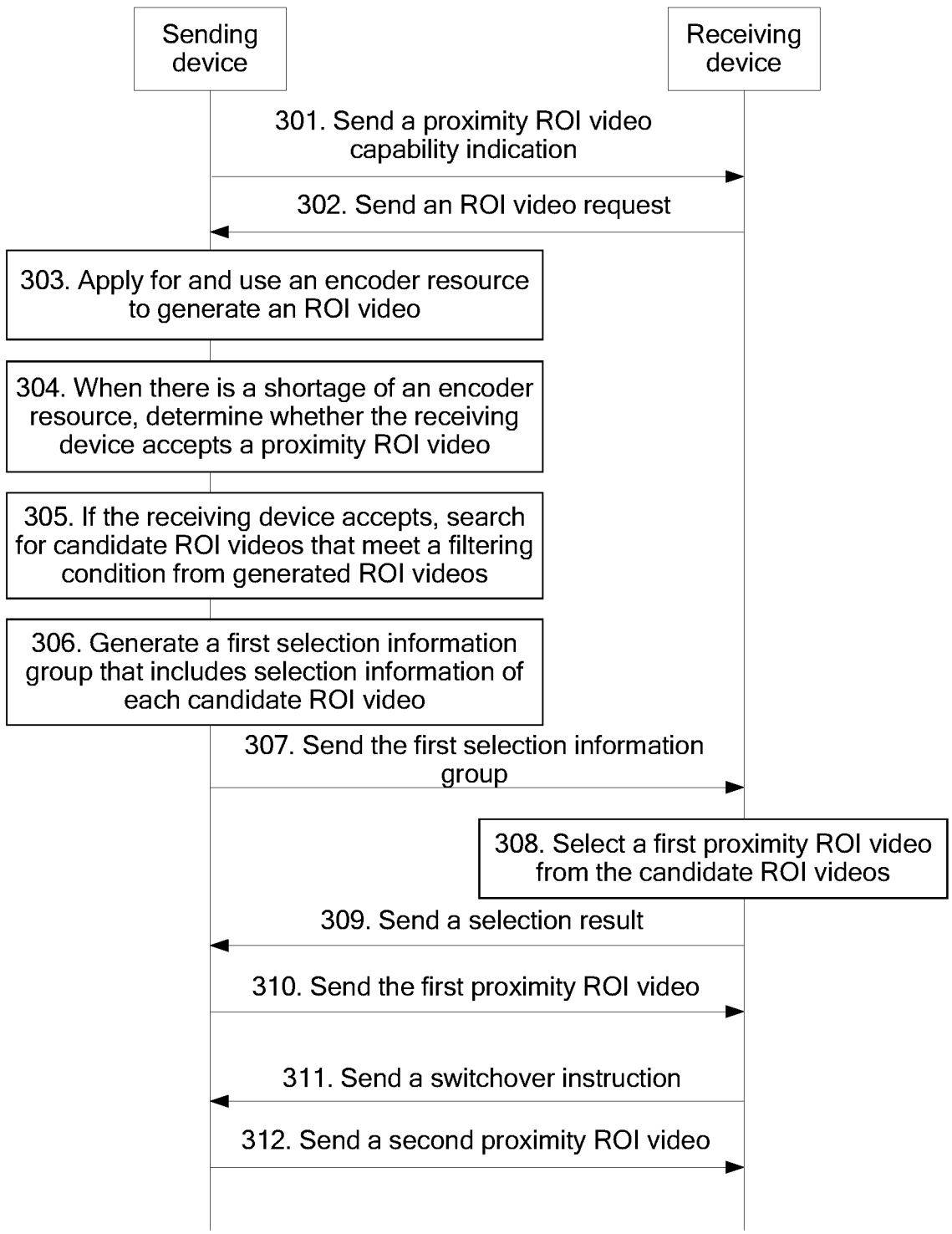
FIG. 3I is a flowchart of an ROI video implementation method according to another embodiment of the present disclosure.

Referring to FIG. 3I, FIG. 3I is a flowchart of an ROI video implementation method according to an embodiment of the present disclosure.

Because there may be multiple candidate ROI videos, when there are multiple candidate ROI videos and the first proximity ROI video cannot meet the requirement of the user of the receiving device, the receiving device may further instruct the sending device to send a second proximity ROI video. As shown in FIG. 3I, in this embodiment, after step 301 to step 310, the method may include the following steps.

Step 311: The receiving device sends a switchover instruction to the sending device, where the switchover instruction is used to instruct the sending device to send a second proximity ROI video to the receiving device.

When the first selection information group is saved in the receiving device, the receiving device may select, from the candidate ROI videos, a candidate ROI video as the second proximity ROI video according to the first selection information group when there is a requirement, and send the switchover instruction to the sending device, to instruct the sending device to send the second proximity ROI video to the receiving device. For example, when the user that uses the receiving device is not satisfied with the first proximity ROI video, the receiving device may select, from the candidate ROI videos, a candidate ROI video that is different from the first proximity ROI video, and send, to the sending device, a selection result that includes an ID of the candidate ROI video.

A manner of sending the switchover instruction is similar to a manner of sending the selection result, and details are not described herein.

Step 312: The sending device sends the second proximity ROI video to the receiving device.

After receiving the switchover instruction sent by the receiving device, the sending device determines the second proximity ROI video according to the switchover instruction. For example, when the switchover instruction includes an identifier (ID) of a candidate ROI video, the sending device may select, as the second proximity ROI video, the candidate ROI video corresponding to the ID.

After receiving the switchover instruction, the sending device first determines whether the second proximity ROI video selected by the receiving device can be sent, and then notifies the receiving device of a determining result using a switchover response. If the second proximity ROI video can be sent, a switchover response that includes affirmative information is sent, to indicate that the second proximity ROI video can be sent. If the second proximity ROI video cannot be sent, a switchover response that includes negative information is sent, to indicate that the second proximity ROI video cannot be sent, so as to prevent the receiving device from being in a wait state for indefinite duration if the sending device cannot send the second proximity ROI video.

If the sending device can send the second proximity ROI video to the receiving device, after sending the switchover response, the sending device may select, as the second proximity ROI video, the candidate ROI video corresponding to the ID, and send the second proximity ROI video to the receiving device.

Figure 3J:
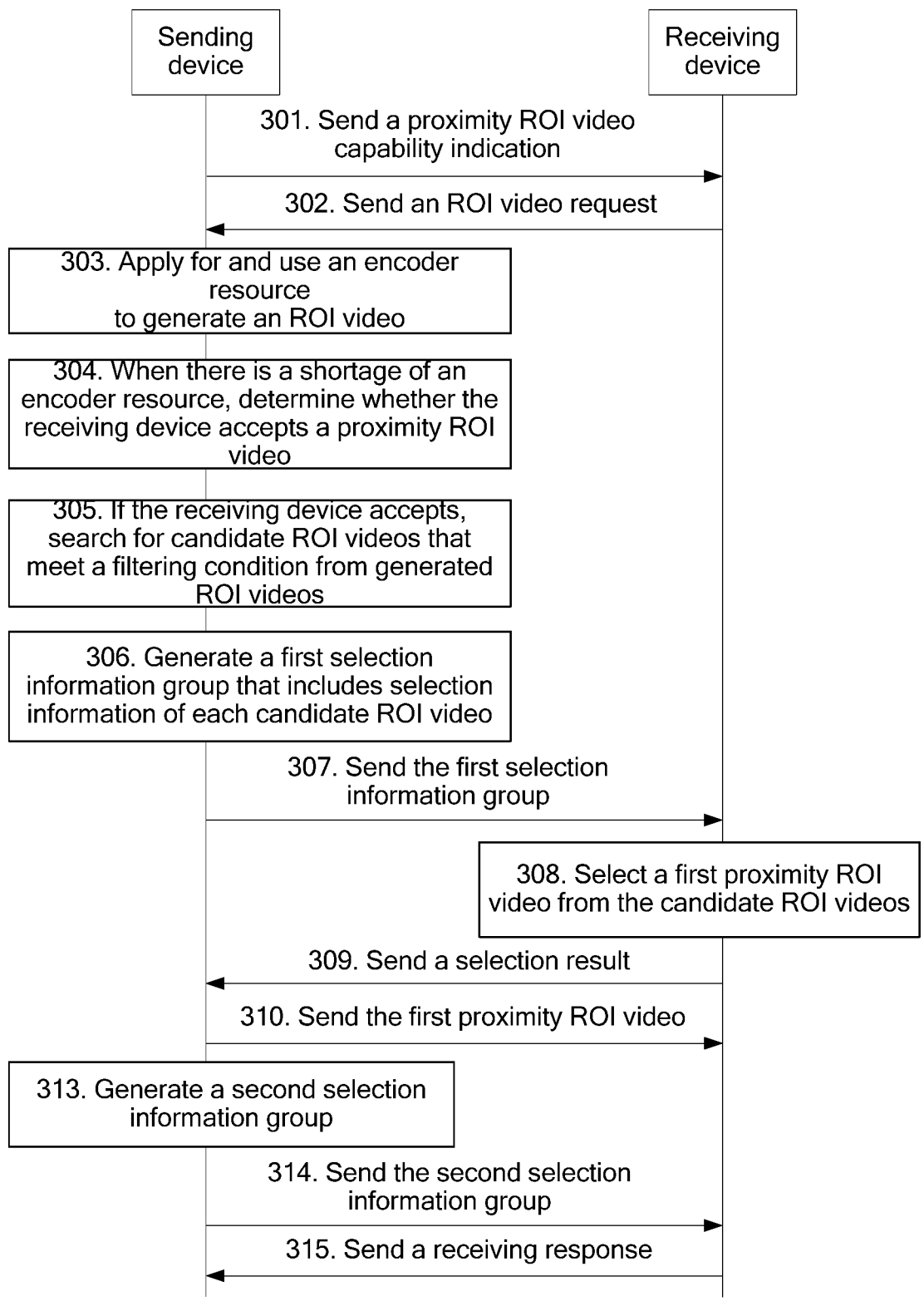
FIG. 3J is a flowchart of an ROI video implementation method according to another embodiment of the present disclosure.

Referring to FIG. 3J, FIG. 3J is a flowchart of an ROI video implementation method according to an embodiment of the present disclosure.

The candidate ROI videos are generated ROI videos. Therefore, with a change of the generated ROI videos, the candidate ROI videos may also change. To facilitate switching between proximity ROI videos for the current receiving device, the sending device further needs to update the first selection information group according to the change of the candidate ROI videos. As shown in FIG. 3J, in another embodiment, after step 301 to step 310, the method may further include the following steps.

Step 313: After the candidate ROI videos change, the sending device updates the first selection information group according to the change of the candidate ROI videos, to generate a second selection information group.

The candidate ROI videos are ROI videos generated by the sending device according to generated ROI video requests. Therefore, with a change of another ROI video, the candidate ROI videos may also change. To facilitate switching between proximity ROI videos for the current receiving device, the sending device further needs to update the first selection information group according to the change of the candidate ROI videos, to obtain the second selection information group.

The change of the candidate ROI videos mainly has two cases. One is that there is a newly added candidate ROI video, and the other is that there is an invalid candidate ROI video. If there is a newly added candidate ROI video, selection information of the newly added candidate ROI video is added to the first selection information group, to obtain the second selection information group. If there is an invalid candidate ROI video, selection information of the invalid candidate ROI video is deleted from the first selection information group, to obtain the second selection information group. For example, when an image region of a candidate ROI video changes, it may be determined that the candidate ROI video is invalid, and selection information corresponding to the candidate ROI video is deleted from the first selection information group, to obtain the second selection information group. When a target region corresponding to a generated ROI video changes, and the ROI video meets a condition of being a candidate ROI video, selection information corresponding to the ROI video may be inserted into the first selection information group, to obtain the second selection information group.

Step 314: The sending device sends the second selection information group to the receiving device.

Similar to the first selection information group, the second selection information group may also be sent using a SIP message in a signaling plane or an RTCP message in a media stream. Details are not described herein.

Step 315: The receiving device sends a receiving response to the sending device after receiving the second selection information group.

After receiving the second selection information group, the receiving device saves the second selection information group, and deletes the saved first selection information group. After the second selection information group is saved, the receiving response may be further sent to the sending device, to indicate that the second selection information group is received. The receiving response may not carry an extra parameter. The receiving response may be carried in an RTCP message in a media stream, or may be carried in a SIP message in a signaling plane.

When the receiving response is carried in the RTCP message in the media stream, the RTCP message may be extended with reference to RFC4585 and RFC5104, an extension type is "Payload-Specific Feedback Messages", and a format corresponding to a current message NewNearROIGroup_Response is shown in FIG. 3K. SSRC is an RTCP intrinsic parameter.

When the receiving response is carried in the SIP message in the signaling plane, the ROI video request may be carried using a header field or an extended body of related information such as INFO, UPDATE, or NOTIFY. A manner of carrying the receiving response using an extended body in a 200 (INFO) message is used as an example for description in the following.

---

SIP/2.0 200 OK
......
Content-Type: application/ROI
Type=NewNearROIGroup_Response

---

It should be noted that, an execution sequence between step 311 to step 312 and step 313 to step 315 is not limited in the present disclosure. When step 311 to step 312 are first performed, the receiving device may determine the second proximity ROI video according to the first selection information group. When step 313 to step 315 are first performed, the receiving device may determine the second proximity ROI video according to the second selection information group.

In the foregoing embodiment, when a sending device cannot generate an ROI video according to an ROI video request, the sending device may select a proximity ROI video by interacting with a receiving device, and send the proximity ROI video to the receiving device. In another embodiment of the present disclosure, a sending device may automatically select a proximity ROI video from generated ROI videos, and send the proximity ROI video to a receiving device. The method may include the following steps.

Referring to FIG. 4A, FIG. 4A is a flowchart of an ROI video implementation method according to another embodiment of the present disclosure. The ROI video implementation method in the present disclosure is described in detail in the following with reference to FIG. 4A.

Step 401: A sending device sends a proximity ROI video capability indication to a receiving device.

Step 402: The receiving device sends an ROI video request to the sending device.

Step 403: After receiving the ROI video request, the sending device applies for and uses an encoder resource to generate an ROI video.

Step 404: When there is a shortage of an encoder resource, the sending device determines whether the receiving device accepts a proximity ROI video.

Step 405: If the receiving device accepts a proximity ROI video, the sending device searches for candidate ROI videos that meet a filter condition from proximity ROI videos.

Step 401 to step 405 are similar to step 301 to step 305 in the foregoing embodiment. For specific content, refer to the foregoing embodiment, and details are not described herein.

Step 406: The sending device determines a priority of each of the candidate ROI videos.

When there are multiple candidate ROI videos, the sending device determines a priority of each candidate ROI video according to a predetermined priority rule.

Generally, a higher available image ratio of a proximity ROI video can better meet a requirement of a user of the receiving device for an ROI video. A higher effective image ratio of a proximity ROI video results in a clearer display of an object in an overlapped region in a candidate ROI video. Therefore, the priorities of the candidate ROI videos may be determined according to the following principle. A candidate ROI video with a higher available image ratio has a higher priority, and a candidate ROI video with a higher effective image ratio has a higher priority. In actual use, based on this principle, a priority rule may be set according to requirements in different scenarios. For example, the priority rule may be set as follows. A candidate ROI video with a higher available image ratio has a higher priority, and when available image ratios are the same, a candidate ROI video with a higher effective image ratio has a higher priority.

As shown in FIG. 3C to FIG. 3E, in FIG. 3C and FIG. 3D, available image ratios of proximity ROI videos are 100%. However, in FIG. 3E, an available image ratio of a proximity ROI video does not reach 100%. Therefore, a priority of a proximity ROI video corresponding to a horizontal stripe region in FIG. 3C and a priority of a proximity ROI video corresponding to a horizontal stripe region in FIG. 3D are higher than a priority of the proximity ROI video corresponding to a horizontal stripe region in FIG. 3E. Further, even if overlapped regions in FIG. 3C and FIG. 3D cover 100% of target regions, the horizontal stripe region in FIG. 3C is relatively small, that is, an effective image ratio of the proximity ROI video in FIG. 3C is higher than an effective image ratio of the proximity ROI video in FIG. 3D. Therefore, the priority of the proximity ROI video corresponding to the horizontal stripe region in FIG. 3C is higher than the priority of the proximity ROI video corresponding to the horizontal stripe region in FIG. 3D.

Step 407: The sending device selects a candidate ROI video with a highest priority as a first proximity ROI video.

After priority information of all the candidate ROI videos is determined, the sending device may select, according to the priority information of all the candidate ROI videos, the candidate ROI video with a highest priority as the first proximity ROI video.

Step 408: The sending device sends the first proximity ROI video to the receiving device.

After the first proximity ROI video is determined, the sending device sends the first proximity ROI video to the receiving device. Before sending the first proximity ROI video, the sending device may also send a request response to the receiving device.

According to this embodiment, when a sending device cannot generate an ROI video according to an ROI video request, the sending device may automatically select a proximity ROI video from generated ROI videos, and send the proximity ROI video to a receiving device. In this way, the ROI video request can be met without consuming an encoder resource, so as to break through limitation caused by an encoder resource amount to a quantity of ROI video requests that can be simultaneously met by the sending device. Therefore, a problem that the ROI video request cannot be met because of a shortage of an encoder resource can be avoided.

Figure 4B:
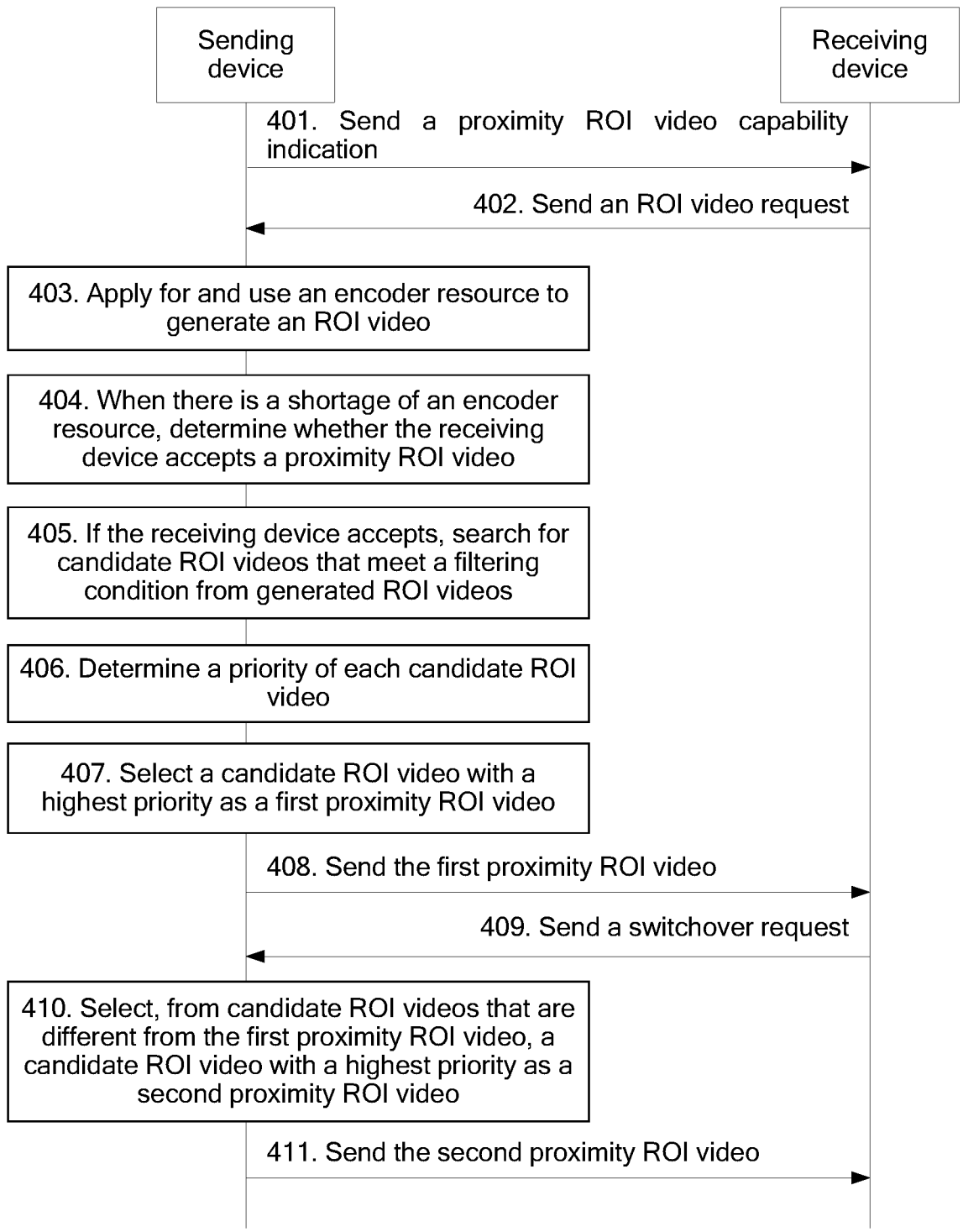
FIG. 4B is a flowchart of an ROI video implementation method according to another embodiment of the present disclosure.

Referring to FIG. 4B, FIG. 4B is a flowchart of an ROI video implementation method according to another embodiment of the present disclosure.

Because the first proximity ROI video is automatically selected by the sending device, the requirement of the user of the receiving device may not be met. When the first proximity ROI video cannot meet the requirement of the user of the receiving device, the receiving device may further instruct the sending device to send another candidate ROI video. Therefore, after step 401 to step 408, the method may further include the following steps.

Step 409: The receiving device sends a switchover request to the sending device, where the switchover request is used to request the sending device to send a candidate ROI video that is different from the first proximity ROI video to the receiving device.

When the first proximity ROI video cannot meet the requirement of the user of the receiving device, the receiving device sends the switchover request to the sending device. The switchover request is used to request the sending device to send a candidate ROI video that is different from the first proximity ROI video to the receiving device.

Step 410: The sending device selects, from candidate ROI videos that are different from the first proximity ROI video, a candidate ROI video with a highest priority as a second proximity ROI video.

After receiving the switchover request, the sending device selects, from the candidate ROI videos according to the priority information of all the candidate ROI videos, the second proximity ROI video that is different from the first proximity ROI video. The second proximity ROI video may be a candidate ROI video with a highest priority in the candidate ROI videos except the first proximity ROI video.

Step 411: The sending device sends the second proximity ROI video to the receiving device.

After selecting the second proximity ROI video, the sending device sends the second proximity ROI video to the receiving device. Similarly, the sending device may first send a switchover response, and then send the second proximity ROI video.

Figure 4C:
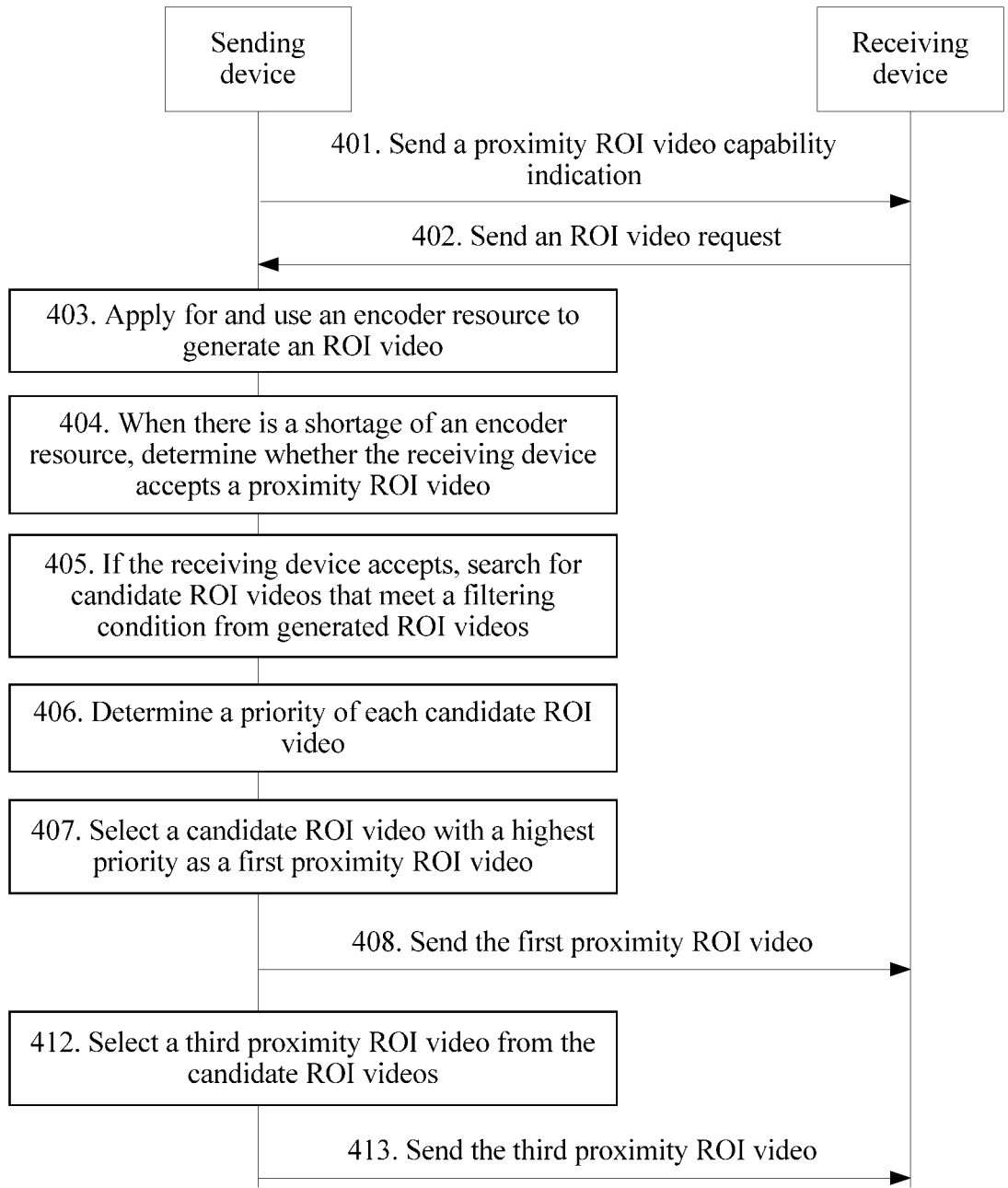
FIG. 4C is a flowchart of an ROI video implementation method according to another embodiment of the present disclosure.

Referring to FIG. 4C, FIG. 4C is a flowchart of an ROI video implementation method according to another embodiment of the present disclosure.

The candidate ROI videos are generated ROI videos. Therefore, with a change of the generated ROI videos, the candidate ROI videos may also change, for example, may become invalid. When the first proximity ROI video becomes invalid in a process of sending the first proximity ROI video to the receiving device, the sending device further needs to select a candidate ROI video from other candidate ROI videos that are still valid, and send the candidate ROI video to the receiving device. As shown in FIG. 4C, after step 401 to step 408, the method may further include the following steps.

Step 412: The sending device selects a third proximity ROI video from the candidate ROI videos if the first proximity ROI video becomes invalid in a process of sending the first proximity ROI video to the receiving device.

When the first proximity ROI video is invalid, if still due to a shortage of an encoder resource, or the like, the sending device still cannot generate an ROI video according to the ROI video request sent by the receiving device, the sending device further needs to select, from the candidate ROI videos that are still valid, a candidate ROI video with a highest priority as the third proximity ROI video according to the priority information of all the candidate ROI videos.

Step 413: The sending device sends the third proximity ROI video to the receiving device.

After the third proximity ROI video is determined, the sending device sends the third proximity ROI video to the receiving device.

In actual use, there may be no other candidate ROI videos after the first proximity ROI video becomes invalid. Therefore, before sending the third proximity ROI video, the sending device may notify, using a switchover response, the receiving device of information such as switchover to the third proximity ROI video or no available proximity ROI video. The switchover response may be carried in an RTCP message in a media stream, or may be carried in a SIP message in a signaling plane. For a specific implementation manner, refer to the foregoing content, and details are not described herein.

According to this embodiment, when a sending device cannot generate an ROI video according to an ROI video request, the sending device may automatically select a proximity ROI video from generated ROI videos, and send the proximity ROI video to a receiving device. In this way, the ROI video request can be met without consuming an encoder resource, so as to break through limitation caused by an encoder resource amount to a quantity of ROI video requests that can be simultaneously met by the sending device. Therefore, a problem that the ROI video request cannot be met because of a shortage of an encoder resource can be avoided.

Corresponding to the ROI video request processing method in the present disclosure, the present disclosure further provides an ROI video request processing apparatus.

Figure 5:
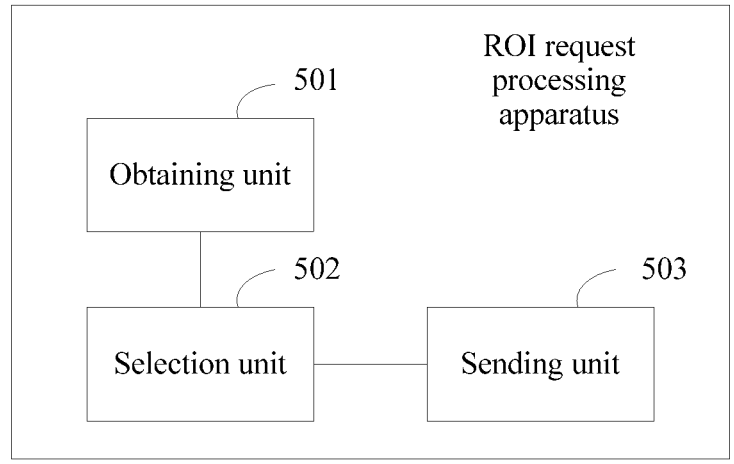
FIG. 5 is a schematic diagram of an ROI video implementation apparatus according to an embodiment of the present disclosure.

Referring to FIG. 5, FIG. 5 is a schematic diagram of an ROI video request processing apparatus according to an embodiment of the present disclosure. The ROI video request processing apparatus may be a sending device, or be disposed on a sending device.

The apparatus includes an obtaining unit 501, a selection unit 502, and a sending unit 503.

The obtaining unit 501 is configured to obtain an ROI video request sent by a receiving device.

The selection unit 502 is configured to select a first proximity ROI video from proximity ROI videos, where the proximity ROI videos are generated ROI videos that include at least a partial region in a target region indicated by the ROI video request.

The sending unit 503 is configured to send the first proximity ROI video selected by the selection unit to the receiving device.

In a possible implementation manner, the selection unit 502 may select the first proximity ROI video from the proximity ROI videos when there is a shortage of an encoder resource and/or when it is determined that the receiving device accepts a proximity ROI video.

In another possible implementation manner, the selection unit 502 may be configured to select the first proximity ROI video from the proximity ROI videos when it is determined that the receiving device accepts a proximity ROI video.

In another possible implementation manner, the selection unit 502 may be configured to select the first proximity ROI video from candidate ROI videos, where the candidate ROI videos are proximity ROI videos that meet a filter condition.

In another possible implementation manner, the selection unit 502 may include a priority determining subunit configured to determine a priority of each of the candidate ROI videos; and a first selection subunit configured to select a candidate ROI video with a highest priority as the first proximity ROI video.

Optionally, the priority determining subunit may be configured to determine the priority of each of the candidate ROI videos according to an effective image ratio, where the effective image ratio is a ratio of an area of an overlapped region to an area of a proximity region, the proximity region is an image region of the candidate ROI video, and the overlapped region is an overlapped part between the target region indicated by the ROI video request and the image region of the candidate ROI video; or determine the priority of each of the candidate ROI videos according to an available image ratio, where the available image ratio is a ratio of the area of the overlapped region to an area of the target region.

Optionally, the selection unit 502 may include a selection information generation subunit configured to generate selection information corresponding to each of the candidate ROI videos; a selection information sending subunit configured to send the selection information to the receiving device; and a second selection subunit configured to select, as the first proximity ROI video, a candidate ROI video selected by the receiving device according to the selection information. Optionally, the selection information generation subunit may be configured to generate the selection information corresponding to each of the candidate ROI videos, where each piece of the selection information includes an effective image ratio of a candidate ROI video corresponding to the selection information.

In another embodiment, the selection unit 502 may be further configured to select a second proximity ROI video from the obtained candidate ROI videos after a proximity ROI video change request sent by the receiving device is obtained. The sending unit 503 is further configured to send the second proximity ROI video to the receiving device.

In another embodiment, the selection unit 502 may be further configured to select a third proximity ROI video from the obtained candidate ROI videos when the first proximity ROI video becomes invalid in a process of sending the first proximity ROI video to the receiving device. The sending unit 503 is further configured to send the third proximity ROI video to the receiving device.

Specific manners for executing operations by all modules of the apparatus in the foregoing embodiment are described in detail in the related method embodiment, and details are not described herein. For related parts, refer to partial descriptions in the method embodiment.

It can be learned from the foregoing embodiment that, when a sending device cannot generate an ROI video according to an ROI video request, the sending device may select a proximity ROI video from generated ROI videos and send the proximity ROI video to a receiving device, to prevent the sending device from rejecting the ROI video request of the receiving device because of a shortage of an encoder resource, thereby avoiding an ROI video request failure.

Figure 6:
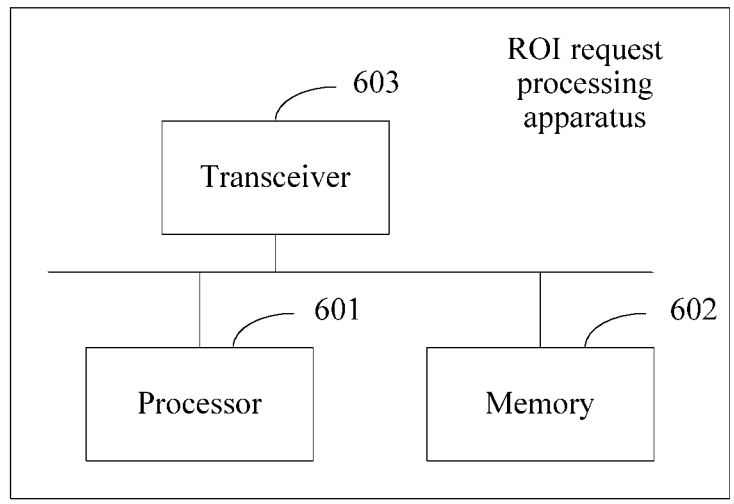
FIG. 6 is a schematic diagram of an ROI video implementation apparatus according to another embodiment of the present disclosure.

Referring to FIG. 6, FIG. 6 is a block diagram of an ROI video request processing apparatus according to another embodiment of the present disclosure. The ROI video request processing apparatus may be a sending apparatus, or be disposed on a sending apparatus.

As shown in FIG. 6, the ROI video request processing apparatus may include modules such as a processor 601, a memory 602, and a transceiver 603. All the modules are mutually connected.

The memory 602 is configured to store a program. The program may include program code, and the program code includes a computer operation instruction. The memory 602 may include a random access memory (RAM), or may include a non-volatile memory 602, for example, at least one disk memory 602.

The transceiver 603 is configured to obtain an ROI video request sent by a receiving device.

The processor 601 is configured to select a first proximity ROI video from proximity ROI videos, where the proximity ROI videos are generated ROI videos that include at least a partial region in a target region indicated by the ROI video request.

The processor 601 may select the first proximity ROI video from the proximity ROI videos when there is a shortage of an encoder resource and/or when it is determined that the receiving device accepts a proximity ROI video.

When selecting the first proximity ROI video, the processor 601 may select the first proximity ROI video from candidate ROI videos, where the candidate ROI videos are proximity ROI videos that meet a filter condition. The processor 601 may determine a priority of each of the candidate ROI videos, and select a candidate ROI video with a highest priority as the first proximity ROI video. Alternatively, the processor 601 may generate selection information corresponding to each of the candidate ROI videos, send the selection information to the receiving device, and select, as the first proximity ROI video, a candidate ROI video selected by the receiving device according to the selection information.

When determining the priority of each of the candidate ROI videos, the processor 601 may determine the priority of each of the candidate ROI videos according to an effective image ratio, where the effective image ratio is a ratio of an area of an overlapped region to an area of a proximity region, the proximity region is an image region of the candidate ROI video, and the overlapped region is an overlapped part between the target region indicated by the ROI video request and the image region of the candidate ROI video. Alternatively, the processor 601 may determine the priority of each of the candidate ROI videos according to an available image ratio, where the available image ratio is a ratio of the area of the overlapped region to an area of the target region.

When generating the selection information corresponding to each of the candidate ROI videos, the processor 601 may generate the selection information corresponding to each of the candidate ROI videos, where each piece of the selection information includes an effective image ratio of a candidate ROI video corresponding to the selection information.

The transceiver 603 is further configured to send the first proximity ROI video to the receiving device.

In another embodiment, the processor 601 is further configured to select a second proximity ROI video from the obtained candidate ROI videos after the transceiver 603 obtains a proximity ROI video change request sent by the receiving device. The transceiver 603 is further configured to send the second proximity ROI video to the receiving device.

In another embodiment, the processor 601 is further configured to select a third proximity ROI video from the obtained candidate ROI videos when the first proximity ROI video becomes invalid in a process of sending the first proximity ROI video to the receiving device. The transceiver 603 is further configured to send the third proximity ROI video to the receiving device.

Specific manners for executing operations by all modules of the apparatus in the foregoing embodiment are described in detail in the related method embodiment, and details are not described herein. For related parts, refer to partial descriptions in the method embodiment.

It can be learned from the foregoing embodiment that, when a sending device cannot generate an ROI video according to an ROI video request, the sending device may select a proximity ROI video from generated ROI videos and send the proximity ROI video to a receiving device, to prevent the sending device from rejecting the ROI video request of the receiving device because of a shortage of an encoder resource, thereby avoiding an ROI video request failure.

A person skilled in the art may clearly understand that, the technologies in the embodiments of the present disclosure may be implemented by software in addition to a necessary general hardware platform. Based on such an understanding, the technical solutions of the present disclosure essentially or the part contributing to the prior art may be implemented in a form of a software product. The software product is saved in a storage medium, such as a read-only memory (ROM)/RAM, a hard disk, or an optical disc, and includes several instructions for instructing a computer device (which may be a personal computer, a server, or a network device) to perform the methods described in the embodiments or some parts of the embodiments of the present disclosure.

The embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly; for related parts, reference may be made to partial descriptions in the method embodiment.

The foregoing descriptions are implementation manners of the present disclosure, but are not intended to limit the protection scope of the present disclosure. Any modification, equivalent replacement, and improvement made without departing from the spirit and principle of the present disclosure shall fall within the protection scope of the present disclosure.

What is claimed is:

1. A region of interest (ROI) video request processing method, wherein the method comprises:
    obtaining an ROI video request from a receiving device after sending an original video to the receiving device;
    determining whether there are sufficient encoder resources to generate an ROI video according to the ROI video request from the receiving device;
    selecting a first proximity ROI video from proximity ROI videos when determining that there are not sufficient resources to generate the ROI video, wherein the proximity ROI videos are generated ROI videos that comprise at least a partial region in a target region indicated by the ROI video request, wherein the target region is a region in the original video; and
    sending the first proximity ROI video to the receiving device.

2. The method according to claim 1, further comprising generating the ROI video instead of selecting the first proximity ROI video from the proximity ROI videos when there are sufficient encoder resources to generate the ROI video according to the ROI video request.

3. The method according to claim 1, wherein selecting the first proximity ROI video from the proximity ROI videos comprises selecting the first proximity ROI video from the proximity ROI videos only when the ROI video request indicates that the receiving device is willing to accept a proximity ROI video, wherein the first proximity ROI video is selected such that the ROI video re quest is satisfied without consuming encoder resources that would otherwise be consumed by generating the ROI video according to the ROI video request, and wherein the ROI video request is received by a sending device configured to provide video communication services to one or more receiving devices.

4. The method according to claim 1, wherein selecting the first proximity ROI video from the proximity ROI videos comprises selecting the first proximity ROI video from candidate ROI videos, and wherein the candidate ROI videos are proximity ROI videos that meet a filter condition.

5. The method according to claim 4, wherein selecting the first proximity ROI video from the candidate ROI videos comprises:
    determining a priority of each of the candidate ROI videos; and
    selecting a candidate ROI video with a highest priority as the first proximity ROI video.

6. The method according to claim 5, wherein determining the priority of each of the candidate ROI videos comprises:
    either determining the priority of each of the candidate ROI videos according to an effective image ratio, wherein the effective image ratio is a ratio of an area of an overlapped region to an area of a proximity region, wherein the proximity region is an image region of the candidate ROI video, and wherein the overlapped region is an overlapped part between the target region indicated by the ROI video request and the image region of the candidate ROI video; or
    determining the priority of each of the candidate ROI videos according to an available image ratio, wherein the available image ratio is a ratio of the area of the overlapped region to an area of the target region.

7. The method according to claim 4, wherein selecting the first proximity ROI video from the candidate ROI videos comprises:
    generating selection information corresponding to each of the candidate ROI videos;
    sending the selection information to the receiving device, wherein the selection information is sent in one of a signalling plane of a session initiation protocol (SIP) message or a media stream of a real-time control protocol (RTCP) message; and selecting, as the first proximity ROI video, a candidate ROI video selected by the receiving device according to the selection information.

8. The method according to claim 7, wherein generating the selection information corresponding to each of the candidate ROI videos comprises generating the selection information corresponding to each of the candidate ROI videos, and wherein each piece of the selection information comprises an effective image ratio of a candidate ROI video corresponding to the selection information.

9. The method according to claim 4, wherein the method further comprises:
selecting a second proximity ROI video from the candidate ROI videos after a proximity ROI video change request sent by the receiving device is obtained; and
sending the second proximity ROI video to the receiving device.

10. The method according to claim 4, wherein the method further comprises:
selecting a third proximity ROI video from the candidate ROI videos when the first proximity ROI video becomes invalid in a process of sending the first proximity ROI video to the receiving device; and
sending the third proximity ROI video to the receiving device.

11. The method according to claim 1, wherein the ROI video request is carried in one of a media stream of a real-time control protocol (RTCP) message or a signaling plane of a session initiation protocol (SIP) message.

12. The method according to claim 11, wherein when the ROI video request is carried in the media stream of the RTCP message, the RTCP message is extended to include a field indicating whether the receiving device is willing to accept a proximity ROI video.

13. The method according to claim 11, when the ROI video request is carried in the signaling plane of the SIP message, the ROI video request is carried using an extended body of a SIP INFO message.

14. A region of interest (ROI) video request processing apparatus, comprising:
a non-transitory computer readable medium having a plurality of computer readable instructions stored thereon; and
a processor coupled to the computer readable medium and configured execute the plurality of computer readable instructions to:
obtain an ROI video request from a receiving device after the apparatus sends an original video to the receiving device;
determine whether there are sufficient encoder resources to generate an ROI video according to the ROI video request from the receiving device;
select a first proximity ROI video from proximity ROI videos when the processor determines that there are not sufficient resources to generate the ROI video, wherein the proximity ROI videos are generated ROI videos that comprise at least a partial region in a target region indicated by the ROI video request, wherein the target region is a region in the original video; and
send the first proximity ROI video selected to the receiving device.

15. The apparatus according to claim 14, wherein the processor is further configured to execute the plurality of computer readable instructions to generate the ROI video instead of selecting the first proximity ROI video from the proximity ROI videos when there are sufficient encoder resources to generate the ROI video according to the ROI video request.

16. The apparatus according to claim 14, wherein the processor is further configured to execute the plurality of computer readable instructions to select the first proximity ROI video from the proximity ROI videos only when the ROI video request indicates that the receiving device is willing to accepts a proximity ROI video.

17. The apparatus according to claim 14, wherein the processor is further configured to execute the plurality of computer readable instructions to select the first proximity ROI video from candidate ROI videos, and wherein the candidate ROI videos are proximity ROI videos that meet a filter condition.

18. The apparatus according to claim 17, wherein the processor is further configured to execute the plurality of computer readable instructions to:
determine a priority of each of the candidate ROI videos; and
select a candidate ROI video with a highest priority as the first proximity ROI video.

19. The apparatus according to claim 18, wherein the processor is further configured to execute the plurality of computer readable instructions to:
either determine the priority of each of the candidate ROI videos according to an effective image ratio, wherein the effective image ratio is a ratio of an area of an overlapped region to an area of a proximity region, wherein the proximity region is an image region of the candidate ROI video, and wherein the overlapped region is an overlapped part between the target region indicated by the ROI video request and the image region of the candidate ROI video; or
determine the priority of each of the candidate ROI videos according to an available image ratio, wherein the available image ratio is a ratio of the area of the overlapped region to an area of the target region.

20. The apparatus according to claim 17, wherein the processor is further configured to execute the plurality of computer readable instructions to:
generate selection information corresponding to each of the candidate ROI videos;
send the selection information to the receiving device; and
select, as the first proximity ROI video, a candidate ROI video selected by the receiving device according to the selection information.

21. The apparatus according to claim 20, wherein the processor is further configured to execute the plurality of computer readable instructions to generate the selection information corresponding to each of the candidate ROI videos, and wherein each piece of the selection information comprises an effective image ratio of a candidate ROI video corresponding to the selection information.

22. The apparatus according to claim 17, wherein the processor is further configured to execute the plurality of computer readable instructions to:
select a second proximity ROI video from the candidate ROI videos after a proximity ROI video change request sent by the receiving device is obtained; and
send the second proximity ROI video to the receiving device.

23. A computer program product comprising a non-transitory computer readable storage medium storing program code thereon for a region of interest (ROI) video request processing method, the program code comprising instructions for executing a method that comprises:

obtaining an ROI video request from a receiving device after sending an original video to the receiving device;

determining whether there are sufficient encoder resources to generate an ROI video according to the ROI video request from the receiving device;

selecting a first proximity ROI video from proximity ROI videos when determining that there are not sufficient resources to generate the ROI video, wherein the proximity ROI videos are generated ROI videos that comprise at least a partial region in a target region indicated by the ROI video request, wherein the target region is a region in the original video; and sending the first proximity ROI video to the receiving device.

* * * * *

UNITED STATES PATENT AND TRADEMARK OFFICE
CERTIFICATE OF CORRECTION

PATENT NO. : 10,560,505 B2
APPLICATION NO. : 15/492297
DATED : February 11, 2020
INVENTOR(S) : Liangliang Liu and Weiwei Yang Page 1 of 1

It is certified that error appears in the above-identified patent and that said Letters Patent is hereby corrected as shown below:

In the Claims

Claim 3, Column 24, Line 25: "video re quest is satisfied" should read "video request is satisfied"

Claim 16, Column 26, Line 9: "to accepts a proximity" should read "to accept a proximity"

Signed and Sealed this
Fifth Day of May, 2020

Andrei Iancu
*Director of the United States Patent and Trademark Office*